(12) United States Patent
Arlt et al.

(10) Patent No.: US 8,191,358 B2
(45) Date of Patent: Jun. 5, 2012

(54) REGENERATION METHOD FOR A STORAGE CATALYTIC CONVERTER

(75) Inventors: Tino Arlt, Regensburg (DE); Thomas Baumann, Regensburg (DE); Gerd Rösel, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 801 days.

(21) Appl. No.: 12/237,594

(22) Filed: Sep. 25, 2008

(65) Prior Publication Data
US 2009/0084089 A1 Apr. 2, 2009

(30) Foreign Application Priority Data
Sep. 27, 2007 (DE) .................. 10 2007 046 353

(51) Int. Cl.
*F01N 3/00* (2006.01)
(52) U.S. Cl. ........................... 60/295; 60/285; 60/301
(58) Field of Classification Search .............. 60/285, 60/286, 295, 301
See application file for complete search history.

(56) References Cited

U.S. PATENT DOCUMENTS

| | | | | |
|---|---|---|---|---|
| 5,740,669 A * | 4/1998 | Kinugasa et al. | .............. | 60/285 |
| 6,101,809 A * | 8/2000 | Ishizuka et al. | .............. | 60/276 |
| 6,588,251 B2 * | 7/2003 | Zhang et al. | .............. | 73/23.32 |
| 6,834,497 B2 * | 12/2004 | Miyoshi et al. | .............. | 60/277 |
| 6,976,356 B2 * | 12/2005 | Okada et al. | .............. | 60/286 |
| 2002/0128146 A1 * | 9/2002 | Druckhammer et al. | ....... | 502/20 |
| 2003/0051464 A1 * | 3/2003 | Wachi et al. | .............. | 60/274 |
| 2003/0056500 A1 * | 3/2003 | Huynh et al. | .............. | 60/295 |
| 2007/0051098 A1 * | 3/2007 | Kaneko | .............. | 60/295 |
| 2007/0204595 A1 * | 9/2007 | Hanaoka et al. | .............. | 60/274 |

FOREIGN PATENT DOCUMENTS

| DE | 10260886 | 5/2004 |
|---|---|---|
| EP | 1118756 | 7/2001 |

* cited by examiner

*Primary Examiner* — Thomas Denion
*Assistant Examiner* — Patrick Maines
(74) *Attorney, Agent, or Firm* — King & Spalding L.L.P.

(57) ABSTRACT

A regeneration method for a storage catalytic converter in an exhaust-gas purification system of an internal combustion engine, has the following steps: (a) switching of the internal combustion engine from a standard operating mode with a lean exhaust gas to a regeneration mode with a rich exhaust gas, (b) measurement of a nitrogen oxide concentration in the exhaust gas of the internal combustion engine after the switchover to the regeneration mode, (c) determination of a characteristic variable of a desorption peak of the measured nitrogen oxide concentration after the switchover to the regeneration mode, and (d) minimization of the characteristic variable of the desorption peak through controlling of the internal combustion engine as a function of the measured characteristic variable of the desorption peak.

18 Claims, 2 Drawing Sheets

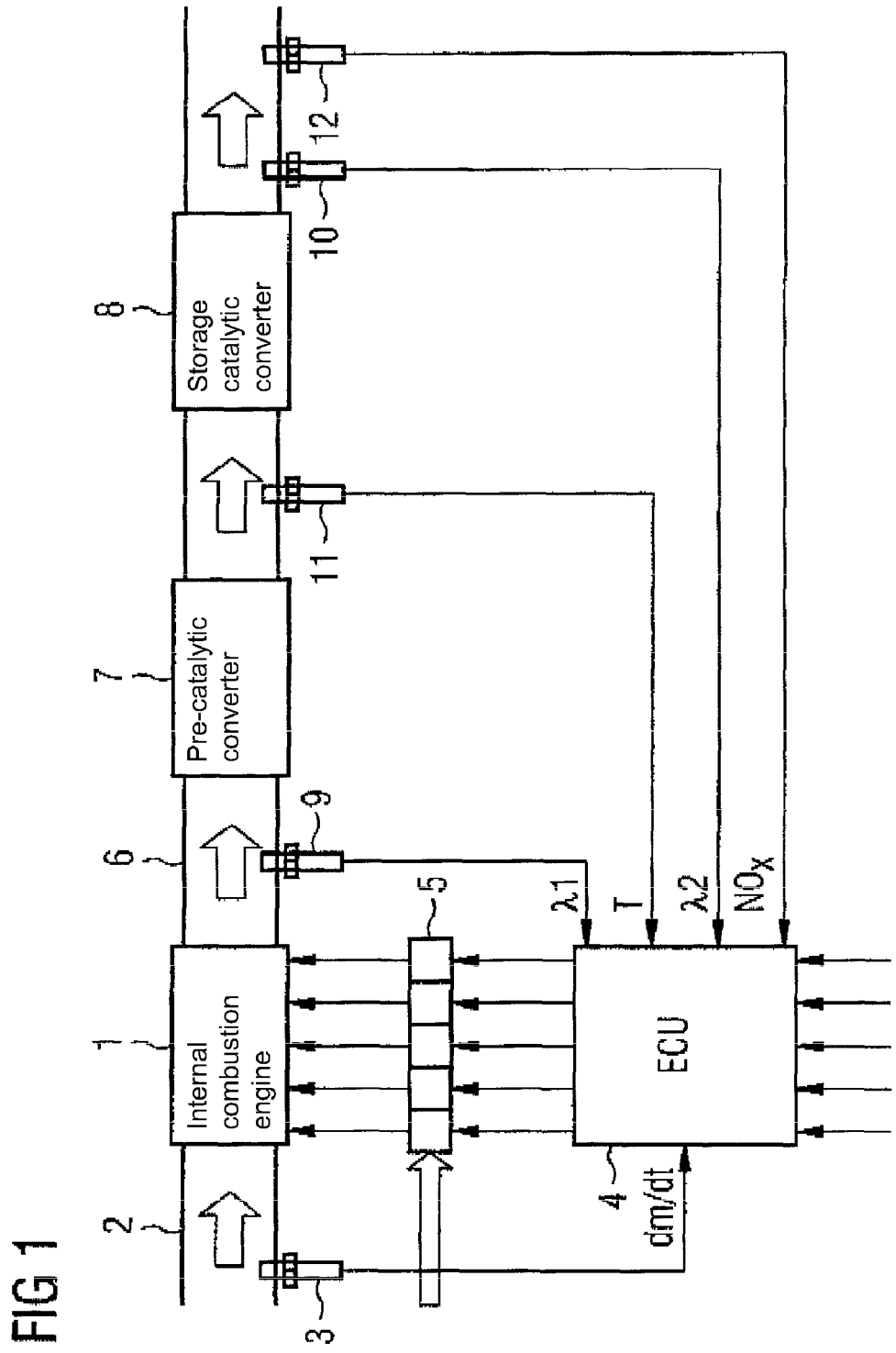

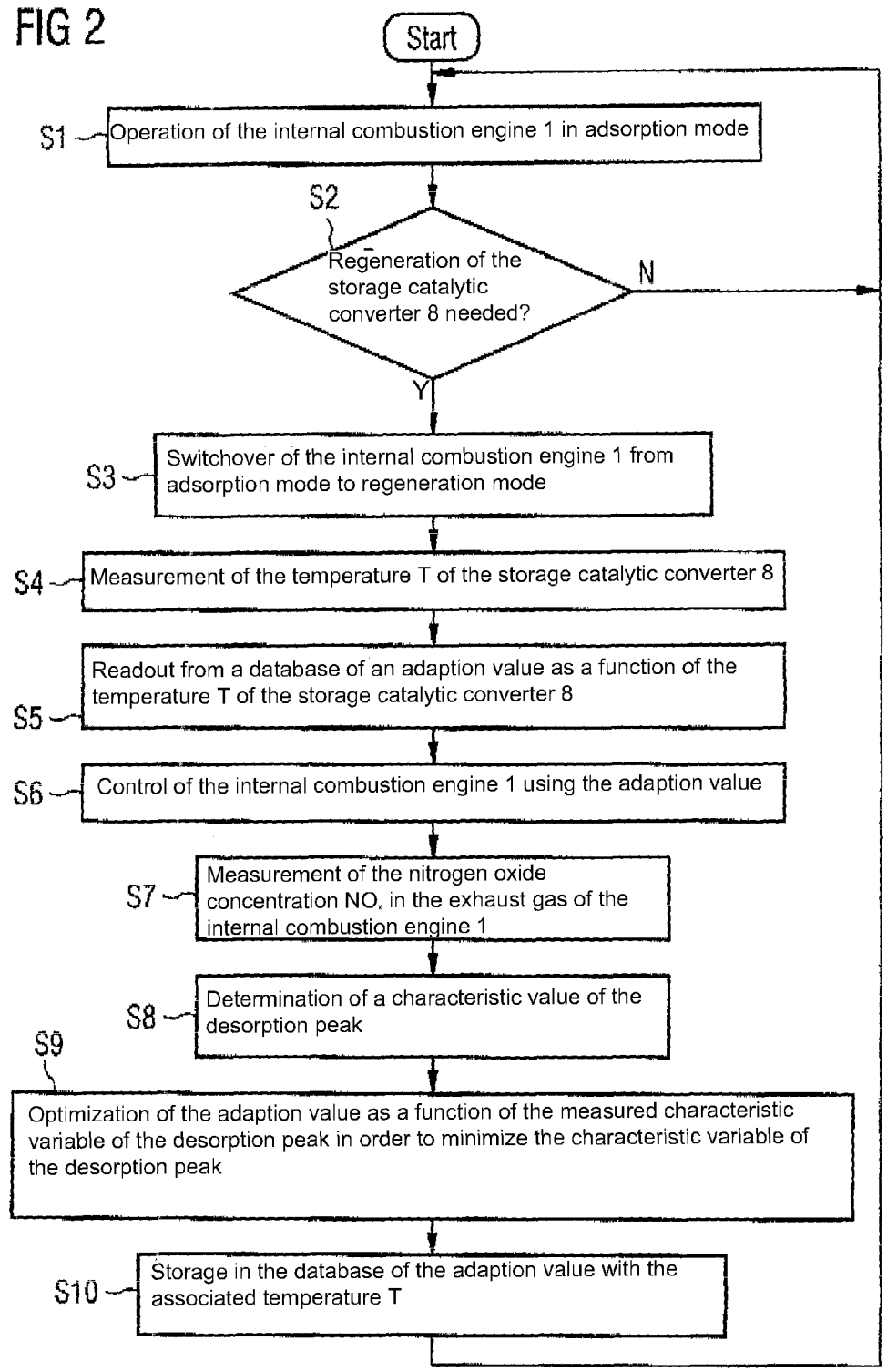

REGENERATION METHOD FOR A STORAGE CATALYTIC CONVERTER

CROSS-REFERENCE TO RELATED APPLICATIONS

This application claims priority from German Patent Application No. 10 2007 046 353.9 filed Sep. 27, 2007, the contents of which is incorporated herein by reference in its entirety.

TECHNICAL FIELD

The invention relates to a regeneration method for a storage catalytic converter in an exhaust-gas purification system of an internal combustion engine.

BACKGROUND

Modern exhaust-gas purification systems for internal combustion engines usually comprise a $NO_x$ storage catalytic converter which, when the internal combustion engine is in lean operating mode, temporarily stores the nitrogen oxides which are produced. However, the storage capacity of such $NO_x$ storage catalytic converters is limited, so the exhaust-gas purification system regularly has to switch over to a regeneration mode, in which the nitrogen oxides stored in the $NO_x$ storage catalytic converter are released and reduced to nitrogen. In this regeneration mode, the internal combustion engine is operated with a rich exhaust-gas mixture, by which means hydrocarbons are provided in the exhaust gas as reducing agents, which reduce the stored nitrogen oxides to harmless nitrogen.

A problem with these known exhaust-gas purification systems, however, is the fact that shortly after the switchover to the regeneration mode, a desorption peak occurs in the exhaust gas downstream of the $NO_x$ storage catalytic converter. This means that the nitrogen oxide concentration in the exhaust gas of the internal combustion engine downstream of the $NO_x$ storage catalytic converter rises sharply for a short period upon switchover to the regeneration mode, as the nitrogen oxides stored in the $NO_x$ storage catalytic converter have then already been released, but have not yet have been reduced to nitrogen. In conventional exhaust-gas purification systems, an unwanted emission of nitrogen oxides therefore occurs upon switchover to regeneration mode due to the desorption peak.

An exhaust-gas purification system for an internal combustion engine is also known from EP 1 118 756 B1 in which the $NO_x$ desorption peak is determined and taken into account in the controlling of the internal combustion engine. This patent specification, however, is aimed solely at optimizing regeneration, without affecting the desorption peak itself. Here, the desorption peak is therefore merely evaluated, but not reduced. Here, too, a desorption peak therefore occurs upon switchover to regeneration mode, which is accompanied by unwanted nitrogen oxide emissions.

SUMMARY

The nitrogen oxide emissions in the above-described conventional exhaust-gas purification systems comprising an $NO_x$ storage catalytic converter can be reduced.

According to an embodiment, a regeneration method for a storage catalytic converter in an exhaust-gas purification system of an internal combustion engine, may comprise the following steps:

a) switching of the internal combustion engine from a standard operating mode with a lean exhaust gas to a regeneration mode with a rich exhaust gas,
b) measurement of a nitrogen oxide concentration in the exhaust gas of the internal combustion engine after the switchover to the regeneration mode,
c) determination of a characteristic variable of a desorption peak of the measured nitrogen oxide concentration after the switchover to the regeneration mode, and
d) minimization of the characteristic variable of the desorption peak through controlling of the internal combustion engine as a function of the measured characteristic variable of the desorption peak.

According to another embodiment, an engine control unit for an internal combustion engine comprising a storage catalytic converter and a program memory in which a control program is stored which, when running, may be operable to perform such a method.

According to a further embodiment, the regeneration method may further comprise the following steps:

a) determination of an adaption value for controlling the internal combustion engine as a function of the measured characteristic variable of the desorption peak, wherein the controlling of the internal combustion engine with the adaption value minimizes the characteristic variable of the desorption peak, and
b) storage of the determined adaption value in a database for a later regeneration mode.

According to a further embodiment, the regeneration method may further comprise the following steps:

a) determination of a catalytic converter temperature of the storage catalytic converter, and
b) storage of the determined catalytic converter temperature together with the determined adaption value in the database for a later regeneration mode.

According to a further embodiment, the regeneration method may further comprise the following steps:

a) reading out of the adaption value, stored in a preceding regeneration mode, depending on the catalytic converter temperature, and
b) controlling of the internal combustion engine with the read-out adaption value during the regeneration mode.

According to a further embodiment, during the regeneration mode the air ratio in the exhaust gas of the internal combustion engine may be adjusted depending on the characteristic variable of the desorption peak so as to minimize the characteristic variable of the desorption peak. According to a further embodiment, a) a storage capacity of the storage catalytic converter may be determined from the characteristic variable of the desorption peak or in another manner,
b) as the storage capacity of the storage catalytic converter decreases, the duration of the regeneration mode can be increased, and
c) as the storage capacity of the storage catalytic converter decreases, the air ratio during the regeneration mode can be increased, and the exhaust gas is consequently less rich.

According to a further embodiment, the catalytic converter temperature can be adjusted as a function of the characteristic variable of the desorption peak so as to minimize the characteristic variable of the desorption peak. According to a further embodiment, the characteristic variable of the desorption peak may be one of the following variables: maximum value of the desorption peak, integral of the measured nitrogen oxide concentration during the desorption peak, and duration of the desorption peak. According to a further embodiment, the internal combustion engine can be a gasoline engine or a diesel engine. According to a further embodiment, the storage catalytic converter may be a nitrogen oxide storage catalytic converter.

BRIEF DESCRIPTION OF THE DRAWINGS

Other advantageous further developments of the invention will, together with the description of various embodiments, be explained in detail below with reference to the figures, in which:

FIG. 1 shows a schematic representation of an exhaust-gas purification system and FIG. 2 shows the regeneration method in the form of a flow diagram.

DETAILED DESCRIPTION

According to various embodiments, the desorption peak is minimized upon switchover from adsorption mode (e.g. lean operating mode, stratified charge mode) to regeneration mode in order to reduce the disruptive nitrogen oxide emissions associated with the desorption peak.

In contrast to the patent specification mentioned in the introduction, EP 1 118 756 B1, the desorption peak is therefore not employed as a measure of the ageing condition of the $NO_x$ storage catalytic converter, but is deliberately minimized.

Within the scope of minimizing the desorption peak in accordance with various embodiments, a characteristic variable of the desorption peak such as, for example, the maximum value of the desorption peak, the integral of the measured nitrogen-oxide concentration during the desorption peak or the duration of the desorption peak, can be preferably minimized. With regard to the desorption peak variable which is to be measured and minimized, the various embodiments are, however, not restricted to the examples above but can in principle also be realized with other variables of the desorption peak. What is important is merely that the desorption peak variable which is to be minimized reflects the quantity of nitrogen oxide which is emitted through the desorption peak.

To minimize the characteristic variable of the desorption peak, a measurement is carried out within the scope of the various embodiments of the nitrogen oxide concentration in the exhaust gas of the internal combustion engine downstream of the storage catalytic converter.

The characteristic desorption peak variable that is of interest is determined from the measured nitrogen oxide concentration in the exhaust gas of the internal combustion engine.

The characteristic variable of the desorption peak is then minimized within the scope of the various embodiments, whereby control of the internal combustion engine is changed as a function of the measured characteristic variable of the desorption peak. The various embodiments therefore provide for a feedback of the measured nitrogen oxide concentration into the control of the internal combustion engine.

According to an embodiment, in order to minimize the characteristic variable of the desorption peak, the air ratio (lambda value) in the exhaust gas of the internal combustion engine is adjusted or varied as a function of the characteristic variable of the desorption peak. Use is made here of the technical understanding that a new and thus undamaged storage catalytic converter needs a different regeneration from an old damaged storage catalytic converter. Thus, the ageing process of the storage catalytic converter proceeds from the surface of the storage catalytic converter and then penetrates ever deeper into the storage catalytic converter. This means that, as the age of the storage catalytic converter increases, a longer regeneration mode is required, the exhaust-gas mixture being adjusted so as to be less rich in order to offset the increased duration of the regeneration mode. In this variant, the storage capacity of the storage catalytic converter is therefore determined from the determined characteristic variable of the desorption peak or in another manner, the storage capacity reflecting the ageing condition of the storage catalytic converter. Determination of the storage capacity from the characteristic variable of the desorption peak is described in the patent specification EP 1 118 756 B1 mentioned in the introduction, so the content of this description with regard to determination of the storage capacity or of the ageing condition of the storage catalytic converter is to be assigned in full to the present description. During regeneration mode, the actual storage capacity of the storage catalytic converter, which storage capacity has been determined for example by means of the method from EP 1 118 756 B1 or by means of an alternative method, is then taken into account in that, as the storage capacity decreases, the duration of and the air ratio during the regeneration mode is increased. This means that, as the storage capacity of the storage catalytic converter decreases, regeneration is carried out for longer but less intensively.

In another embodiment, the characteristic variable of the desorption peak is minimized in that the catalytic converter temperature is adjusted as a function of the characteristic variable of the desorption peak. The catalytic converter temperature can be adjusted, for example, by changing the air ratio in the exhaust gas of the internal combustion engine. In this way, an enrichment of the exhaust gas mixture leads to a rise in the exhaust gas temperature and thus also to a corresponding rise in the catalytic converter temperature. The operating point within the catalytic converter temperature window can thus be changed and optimized with regard to emissions and fuel consumption. The rise in the catalytic converter temperature can, however, also be achieved through other methods which influence the operating temperature of the internal combustion engine, like, for example, adjusting the ignition timing in the direction of "late ignition" or post-injecting fuel.

The two variants described above (adjustment of the air ratio and adjustment of the catalytic converter temperature) for minimizing the characteristic variable of the desorption peak can within the scope of the various embodiments be used alternatively or in combination with one another.

The determination of an adaption value for controlling the internal combustion engine can be preferably also carried out as part of the minimizing of the characteristic variable of the desorption peak. The adaption value in this case is determined such that controlling of the internal combustion engine with the adaption value results in a minimization of the characteristic variable of the desorption peak. The concept of an adaption value used within the scope of the various embodiments is not restricted to a single parameter of the internal combustion engine but covers all the control variables of the internal combustion engine.

The adaption value determined during the regeneration mode may then preferably be stored in a database so that this adaption value can be used during a later regeneration mode in order to control the internal combustion engine and at the same time minimize the desorption peak. The adaption value does not therefore have to be determined afresh in each regeneration mode of the internal combustion engine. Rather, within the scope of operation of the internal combustion engine, a database can be populated with suitable adaption values, which can then be read out during the regeneration mode.

During the storage and reading out of the adaption value, the catalytic converter temperature of the storage catalytic converter may preferably be taken into account. There may therefore preferably be provision for the catalytic converter temperature of the storage catalytic converter to be determined, which can be achieved, for example, by means of a simple measurement via a temperature sensor. The adaption value determined may then preferably be stored in the database together with the catalytic converter temperature. During a later regeneration mode, depending on the measured catalytic converter temperature, the appropriate adaption value is then read out and used to control the internal combustion engine.

The various embodiments may preferably be suitable for gasoline engines and diesel engines but are not restricted to these types of internal combustion engines.

Furthermore, the various embodiments also comprise an engine control unit for an internal combustion engine with a storage catalytic converter and a program memory in which a control program is stored which, when running, executes the regeneration method according to various embodiments.

FIG. 1 shows in schematic form an exhaust-gas purification system for an internal combustion engine 1 in a motor vehicle.

Here, an air-mass flow meter 3 is arranged in an intake section 2 of the internal combustion engine 1, which air-mass flow meter measures the air-mass flow dm/dt sucked in by the internal combustion engine 1 and forwards this to an engine control unit 4 (ECU: Electronic Control Unit), the engine control unit 4 taking the measured air-mass flow dm/dt and further measurement variables into account in the controlling of injection valves 5 of the internal combustion engine, which is known in the art from conventional injection systems.

A pre-catalytic converter 7 and a $NO_x$ storage catalytic converter 8 are arranged in series in an exhaust-gas section 6 of the internal combustion engine, the $NO_x$ storage catalytic converter 8 temporarily storing nitrogen oxides contained in the exhaust gas, which is known from the prior art.

The exhaust-gas purification system also has two lambda probes 9, 10 which are arranged in the exhaust-gas section 6 of the internal combustion engine. Here, the lambda probe 9 is arranged in the exhaust-gas section 6 between the internal combustion engine 1 and the pre-catalytic converter 7 and delivers an air ratio λ1 to the engine control unit 4. The lambda probe 10, on the other hand, is arranged downstream of the $NO_x$ storage catalytic converter 8 and delivers an air ratio λ2 to the engine control unit 4.

The exhaust-gas purification system also has a temperature sensor 11 which is arranged in the exhaust gas section 6 between the pre-catalytic converter 7 and the $NO_x$ storage catalytic converter 8 and measures and forwards to the engine control unit 4 an exhaust gas temperature T.

Finally, the exhaust-gas purification system in this exemplary embodiment also has a nitrogen oxide sensor 12 which is arranged in the exhaust gas section 6 downstream of the $NO_x$ storage catalytic converter 8 and measures and forwards to the engine control unit 4 a nitrogen oxide concentration $NO_x$ in the exhaust gas of the internal combustion engine 1 downstream of the $NO_x$ storage catalytic converter 8.

The engine control unit 4 then takes the air-mass flow dm/dt, the air ratios λ1, λ2, the exhaust gas temperature T and the measured nitrogen oxide concentration $NO_x$ into account in controlling the internal combustion engine 1 and, in particular, in a regeneration mode, in which a regeneration of the $NO_x$ storage catalytic converter 8 occurs.

The regeneration method for the $NO_x$ storage catalytic converter 8 will now be described below with the aid of the flow diagram in FIG. 2.

Firstly, in a first step S1, the internal combustion engine 1 is operated in adsorption mode. This means that the internal combustion engine is operated in a lean operating mode or a stratified-charge mode, the nitrogen oxides contained in the exhaust gas of the internal combustion engine being stored temporarily in the $NO_x$ storage catalytic converter 8.

A check is then carried out in a step S2 as to whether a regeneration of the $NO_x$ storage catalytic converter 8 is required because the storage capacity of the $NO_x$ storage catalytic converter is exhausted.

If no regeneration of the $NO_x$ storage catalytic converter 8 is required, step S1 continues, i.e. the internal combustion engine 1 continues to operate in adsorption mode.

If, on the other hand, a regeneration of the $NO_x$ storage catalytic converter 8 is required, in a step S3 a switchover is carried out from adsorption mode to regeneration mode. This means that the internal combustion engine 1 is operated with a rich exhaust gas mixture in order to provide the $NO_x$ storage catalytic converter 8 with sufficient hydrocarbons as reducing agents so that the nitrogen oxides stored in the $NO_x$ storage catalytic converter 8 can be released and reduced to nitrogen.

Furthermore, in a step S4, the temperature T in the exhaust gas of the internal combustion engine 1 is then measured by the temperature sensor 11, the engine control unit 4 deducing from the temperature T the catalytic converter temperature of the $NO_x$ storage catalytic converter 8.

In a step S5, from a previously created database an adaption value is then read out as a function of the measured temperature T, which adaption value serves in controlling the internal combustion engine 1 and enables minimization of the desorption peak of the nitrogen oxide concentration $NO_x$ downstream of the $NO_x$ storage catalytic converter 8.

The internal combustion engine 1 is then, in a step S6, controlled using the adaption value read out from the database, so as to minimize the desorption peak.

In a step S7, a measurement of the nitrogen oxide concentration $NO_x$ downstream of the $NO_x$ storage catalytic converter 8 is then carried out by means of the nitrogen oxide sensor 12.

In a step S8, the engine control unit 4 then determines from the measured nitrogen oxide concentration $NO_x$ a characteristic variable of the desorption peak such as, for example, the maximum or the integral of the desorption peak.

In a step S9, the engine control unit 4 then computes an optimized adaption value as a function of the characteristic variable of the desorption peak determined in step S8 previously in order to minimize the characteristic variable of the desorption peak. Here, the knowledge that the characteristic variable of the desorption peak also reflects the ageing condition of the $NO_x$ storage catalytic converter 8 is exploited. Depending on the ageing condition of the $NO_x$ storage catalytic converter 8, however, an adapted regeneration should be carried out in order to minimize the desorption peak.

Thus, where the ageing of the $NO_x$ storage catalytic converter 8 is severe, a slow and less intensive regeneration should be carried out.

Where the ageing of the $NO_x$ storage catalytic converter 8 is only slight, on the other hand, rapid and intensive regeneration of the $NO_x$ storage catalytic converter should be carried out.

Depending on the ageing condition and thus depending also on the previously determined characteristic variable of the desorption peak, a corresponding adaption value is then determined which determines the time profile of the air ratio during the regeneration mode.

In a step S10, the optimized adaption value is then stored in the database together with the previously measured temperature T and is then available for the next regeneration mode.

What is claimed:

1. A regeneration method for a storage catalytic converter in an exhaust-gas purification system of an internal combustion engine, comprising the following steps:
    switching of the internal combustion engine from a standard operating mode with a lean exhaust gas to a regeneration mode with a rich exhaust gas,
    determination of a first adaption value based on a determined catalytic converter temperature after the switchover to the regeneration mode,
    controlling of the internal combustion engine during the regeneration mode based on the determined first adaption value,
    measurement of a nitrogen oxide concentration in the exhaust gas of the internal combustion engine after the controlling of the internal combustion engine based on the first adaption value,
    determination of a characteristic variable of a desorption peak of the measured nitrogen oxide concentration after the switchover to the regeneration mode,
    calculating a new adaption value as a function of the determined characteristic variable of the desorption peak, the new adaption value configured to minimize the characteristic variable of the desorption peak during a subsequent regeneration mode; and
    storing the calculated new adaption value for an initial use during the subsequent regeneration mode instead of the first adaption value.

2. The regeneration method according to claim 1, further comprising storage of the determined catalytic converter temperature together with the determined adaption value in the database for a later regeneration mode.

3. The regeneration method according to claim 1, further comprising the following steps:
    determining the first adaption value based on a determined catalytic converter temperature by reading the first adaption value stored in a preceding regeneration mode, depending on the determined catalytic converter temperature, and
    controlling of the internal combustion engine with the read-out first adaption value during the regeneration mode.

4. The regeneration method according to claim 1, wherein during the regeneration mode the air ratio in the exhaust gas of the internal combustion engine is adjusted depending on the characteristic variable of the desorption peak so as to minimize the characteristic variable of the desorption peak.

5. The regeneration method according to claim 1, wherein
    a storage capacity of the storage catalytic converter is determined from the characteristic variable of the desorption peak,
    as the storage capacity of the storage catalytic converter decreases, the duration of the regeneration mode is increased, and
    as the storage capacity of the storage catalytic converter decreases, the air ratio during the regeneration mode is increased, and the exhaust gas is consequently less rich.

6. The regeneration method according to claim 1, wherein the catalytic converter temperature is adjusted as a function of the characteristic variable of the desorption peak so as to minimize the characteristic variable of the desorption peak.

7. The regeneration method according to claim 1, wherein the characteristic variable of the desorption peak is one of the following variables:
    maximum value of the desorption peak,
    integral of the measured nitrogen oxide concentration during the desorption peak,
    duration of the desorption peak.

8. The regeneration method according to claim 1, wherein the internal combustion engine is a gasoline engine or a diesel engine.

9. The regeneration method according to claim 1, wherein the storage catalytic converter is a nitrogen oxide storage catalytic converter.

10. An engine control unit for an internal combustion engine comprising a storage catalytic converter and a program memory in which a control program is stored which, when running, the engine control unit programmed to:
    switch the internal combustion engine from a standard operating mode with a lean exhaust gas to a regeneration mode with a rich exhaust gas,
    determine a first adaption value based on a determined catalytic converter temperature after the switchover to the regeneration mode,
    control of the internal combustion engine during the regeneration mode based on the determined adaption value,
    measure a nitrogen oxide concentration in the exhaust gas of the internal combustion engine after controlling the internal combustion engine based on the first adaption value,
    determine a characteristic variable of a desorption peak of the measured nitrogen oxide concentration after the switchover to the regeneration mode, and
    calculate a new adaption value as a function of the determined characteristic variable of the desorption peak, the new adaption value configured to minimize the characteristic variable of the desorption peak during a subsequent regeneration mode; and
    store the calculated new adaption value for an initial use during the subsequent regeneration mode instead of the first adaption value.

11. The engine control unit according to claim 10, further being operable to:
    store the determined catalytic converter temperature together with the determined adaption value in the database for a later regeneration mode.

12. The engine control unit according to claim 10, further being operable to:
    determine the first adaption value based on a determined catalytic converter temperature by reading the first adaption value stored in a preceding regeneration mode, depending on the determined catalytic converter temperature, and
    control the internal combustion engine with the read-out first adaption value during the regeneration mode.

13. The engine control unit according to claim 10, wherein during the regeneration mode the air ratio in the exhaust gas of the internal combustion engine is adjusted depending on the characteristic variable of the desorption peak so as to minimize the characteristic variable of the desorption peak.

14. The engine control unit according to claim 10, wherein
    a storage capacity of the storage catalytic converter is determined from the characteristic variable of the desorption peak,
    as the storage capacity of the storage catalytic converter decreases, the duration of the regeneration mode is increased, and as the storage capacity of the storage catalytic converter decreases, the air ratio during the regeneration mode is increased, and the exhaust gas is consequently less rich.

15. The engine control unit according to claim 10, wherein the catalytic converter temperature is adjusted as a function of the characteristic variable of the desorption peak so as to minimize the characteristic variable of the desorption peak.

16. The engine control unit according to claim 10, wherein the characteristic variable of the desorption peak is selected from the group consisting of the following variables:

maximum value of the desorption peak,
integral of the measured nitrogen oxide concentration during the desorption peak, and
duration of the desorption peak.

17. The engine control unit according to claim 10, wherein the internal combustion engine is a gasoline engine or a diesel engine.

18. The engine control unit according to claim 10, wherein the storage catalytic converter is a nitrogen oxide storage catalytic converter.

* * * * *